United States Patent [19]

Millet et al.

[11] Patent Number: 4,560,723

[45] Date of Patent: Dec. 24, 1985

[54] CYANOACRYLATE ADHESIVE COMPOSITION HAVING SUSTAINED TOUGHNESS

[75] Inventors: George H. Millet, Oakdale; Edward R. Harrell; Charles D. Wright, both of White Bear Lake, all of Minn.

[73] Assignee: Minnesota Mining and Manufacturing Company, St. Paul, Minn.

[21] Appl. No.: 551,571

[22] Filed: Nov. 14, 1983

[51] Int. Cl.$^4$ .................. C08K 5/01; C08K 5/02; C08K 5/03

[52] U.S. Cl. ..................... 524/486; 524/470; 524/375; 524/369; 524/259; 524/81

[58] Field of Search .............. 524/469, 486, 504, 521, 524/81, 259, 369, 464, 470; 525/80, 244, 302; 526/298, 299

[56] References Cited

U.S. PATENT DOCUMENTS

| | | | |
|---|---|---|---|
| 3,134,747 | 5/1984 | Amos et al. | 524/469 |
| 3,427,274 | 2/1969 | Cornell | 524/153 |
| 3,433,661 | 3/1969 | Maggart et al. | 524/486 |
| 3,496,250 | 2/1970 | Czerwinski | 525/65 |
| 3,655,825 | 4/1972 | Souder et al. | 525/82 |
| 3,668,274 | 6/1972 | Owens et al. | 525/66 |
| 3,699,127 | 10/1972 | O'Sullivan et al. | 524/755 |
| 3,864,426 | 4/1975 | Salensky | 525/65 |
| 4,038,345 | 7/1977 | O'Sullivan et al. | 525/284 |
| 4,102,945 | 7/1978 | Gleave | 525/293 |
| 4,105,715 | 8/1978 | Gleave | 525/276 |
| 4,425,471 | 1/1984 | Millet | 526/75 |
| 4,440,910 | 4/1984 | O'Connor | 524/850 |

FOREIGN PATENT DOCUMENTS

| | | |
|---|---|---|
| 0087304 | 8/1983 | European Pat. Off. . |
| 47-51807 | 12/1972 | Japan . |
| WO83/02450 | 7/1983 | PCT Int'l Appl. . |

*Primary Examiner*—John Kight
*Assistant Examiner*—Kriellion Morgan
*Attorney, Agent, or Firm*—Donald M. Sell; James A. Smith; David R. Cleveland

[57] ABSTRACT

Cyanoacrylate adhesive compositions containing (a) a toughener (e.g., a core-shell copolymer such as an MBS, ABS, or MABS copolymer), the toughener optionally being treated to remove impurities which cause premature polymerization of cyanoacrylates, and (b) cyanoacrylate-compatible, toughener-compatible sustainer (e.g., an organic compound containing one or more unsubstituted or substituted aryl groups, such as diphenylmethane or dichlorobenzene). The inclusion of sustainer provides improved retention of toughness after heat aging of cured bonds of the adhesive.

5 Claims, No Drawings

CYANOACRYLATE ADHESIVE COMPOSITION HAVING SUSTAINED TOUGHNESS

TECHNICAL FIELD

This invention relates to cyanoacrylate adhesive compositions having improved toughness.

BACKGROUND ART

Cyanoacrylate adhesive compositions typically are regarded as having insufficient impact resistance and toughness, a shortcoming which is manifested by low peel strength. Various measures have been proposed to increase the peel strength of cyanoacrylate adhesives. Among such measures are the inclusion of an additive in such adhesives. One proposed additive is prepared by grafting styrene on a rubbery copolymer backbone (e.g., polybutadiene or a styrene-butadiene copolymer), shown in Japanese Published Patent No. 47-51807. Another proposed additive is selected from acrylonitrile-butadiene-styrene ("ABS") terpolymers, methacrylate-butadiene-styrene ("MBS") terpolymers, and vinylidene chloride-acrylonitrile ("VAC") copolymers, shown in U.S. Pat. No. 4,102,945. These latter additives are part of a class of materials which frequently are referred to as "core-shell" or "core-sheath" copolymers, and their chief use is not as an additive for cyanoacrylates, but rather as impact modifiers for polyvinyl chloride resins.

DISCLOSURE OF INVENTION

Although the additives described in the aforementioned references may provide an improvement in cyanoacrylate adhesive peel strength, that improvement rapidly disappears if cured bonds of the resulting adhesive are aged for extended periods of time (e.g., by accelerated aging at temperatures of 70° C. or more for periods of time of one week or more). A further disadvantage of the additives described in the aforementioned U.S. Pat. No. 4,102,945 is that the shelf-life improvement said to be obtained through the use of such additives is not always realized in actual practice. For example, Example No. 17 of U.S. Pat. No. 4,102,945 describes a mixture containing 100 parts of methyl cyanoacrylate and 20 parts of an MBS terpolymer sold by Rohm & Haas under the trademark "Paraloid KM 611". The inclusion of such MBS terpolymer is said to increase the shelf-life of the uncured adhesive at 55° C. from 31 days (methyl cyanoacrylate alone) to 54 days (methyl cyanoacrylate plus MBS). When this example was repeated using commercially available "Acryloid KM 611" (formerly sold as "Paraloid KM 611"), the mixture of methyl cyanoacrylate and MBS terpolymer solidified within 15 minutes at room temperature. Similar results were obtained when several other commercially available copolymers (e.g., "Blendex BTA III F" MBS terpolymer, "Blendex 436" MABS copolymer, and "Acryloid KM 330" acrylic copolymer) were combined with methyl or ethyl cyanoacrylate using the method described in U.S. Pat. No. 4,102,945. Of the copolymers which we have examined, only "Blendex 101" ABS terpolymer does not cause rapid gelation of methyl or ethyl cyanoacrylate (although cure speed does decrease after aging).

The present invention provides, in one aspect, a cyanoacrylate adhesive composition comprising (a) cyanoacrylate monomer, (b) cyanoacrylate-compatible copolymer which comprises a thermoplastic polymer formed onto a rubber polymer (said cyanoacrylate-compatible copolymer is hereafter sometimes referred to as a "toughener"), said toughener optionally being treated to remove impurities which cause premature polymerization of cyanoacrylates, and (c) cyanoacrylate-compatible, toughener-compatible sustainer which provides improved retention of peel strength (e.g., T-peel strength) after heat aging of a cured bond of said adhesive composition. In addition, the present invention provides a method for making adhesive bonds, and bonded articles made thereby.

DETAILED DESCRIPTION

In the practice of the present invention, the cyanoacrylate monomer typically is an ester of 2-cyanoacrylic acid, and a liquid at room temperature and atmospheric pressure. Preferred cyanoacrylate monomers have the formula

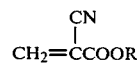

wherein R is a $C_{1-16}$ alkyl, cycloalkyl, alkenyl, cycloalkenyl, or aryl radical. R can be unsubstituted or can be substituted with groups which do not adversely affect the adhesive utility of the cyanoacrylate monomer, and can contain hetero atoms (e.g., oxygen) which likewise do not adversely affect such utility. R can be, for example, methyl, ethyl, n-propyl, isopropyl, n-butyl, isobutyl, sec-butyl, octyl, ethylhexyl, dodecyl, ethoxyethyl, benzyl or chloroethyl. Preferably R is cyclohexyl, alkoxyalkyl or a $C_{1-6}$ alkyl or alkenyl radical. Most preferably, R is methyl, ethyl, n-butyl, or allyl. The cyanoacrylate monomer can be used singly or in admixture. Methods for preparing the cyanoacrylate monomer are well known to those skilled in the art, and cyanoacrylate monomers suitable for use in this invention are commercially available from a variety of sources.

The amount of cyanoacrylate monomer can be varied to suit particular applications. In general, the amount of cyanoacrylate monomer (and the corresponding amounts of toughener and sustainer) should be adjusted to provide the desired degree of bonding and handling performance therewith (e.g., to provide a flowable liquid having a T-peel strength of 3.6 or more kg/cm of width on 0.45 mm thick C1018 cold rolled steel after heat aging of a cured bond thereof for 14 days at 71° C.). A preferred amount of cyanoacrylate monomer is about 50 to 91 percent by weight, more preferably 60 to 80 percent by weight, based on the total weight of cyanoacrylate monomer, toughener, and sustainer.

The toughener (the second ingredient) improves the crack propagation characteristics of compositions of the invention. Suitable tougheners preferably are finely divided, room temperature solid copolymers which have been formed in stages to provide particles with a rubbery (e.g., elastomeric) polymer (e.g., copolymer) core which is wholly or partially surrounded by a shell of thermoplastic polymer (e.g., copolymer) which is harder than the core. The toughener is "cyanoacrylate-compatible", that is, it is soluble or swellable in the cyanoacrylate monomer but does not by itself initiate polymerization of the cyanoacrylate monomer. The toughener optionally is treated to remove cyanoacrylate polymerization-causing impurities, a procedure outlined in more detail below. Suitable tougheners can be selected by treating to remove any such impurities, mixing the treated toughener with the cyanoacrylate monomer, and observing the behavior of the resulting liquid mixture. For suitable tougheners, the toughener-cyanoacrylate monomer mixture will form a stable or apparently stable dispersion which typically has a milky-white appearance. Suitable tougheners, when combined with cyanoacrylate monomer but not combined with sustainer, will also provide cured bonds having initial peel strength higher than that obtained through the use of cyanoacrylate monomer alone, and when further combined with sustainer will provide cured bonds having long-term peel strength. For a nonsuitable toughener, the toughener-cyanoacrylate monomer mixture typically will form a high-viscosity clear or opalescent mixture, or will fail to form a dispersion or mixture. An unsuitable toughener, when combined with cyanoacrylate monomer but not combined with sustainer, will not provide cured bonds with improved initial peel strength.

Preferred tougheners are formed by polymerizing (e.g., grafting) acrylonitrile, methyl methacrylate, styrene or mixtures thereof onto a rubbery core formed by polymerizing mixtures of butadiene, butadiene and styrene, or butadiene and acrylonitrile. Tougheners made from monomer mixtures containing or including acrylonitrile, butadiene, and styrene will be referred to herein as "ABS" tougheners. Tougheners formed from monomer mixtures containing or including methyl methacrylate, butadiene, and styrene will be referred to herein as "MBS" tougheners. Tougheners formed from monomer mixtures containing or including methyl methacrylate, acrylonitrile, butadiene, and styrene will be referred to herein as "MABS" tougheners. If desired, other monomers can be combined with those listed above or used in place thereof, e.g., ethylenically unsaturated monomers such as butyl acrylate, hexyl acrylate, ethylhexyl acrylate, isooctyl acrylate, isoprene, or known crosslinking agents such as divinyl benzene, diacrylates, or dimethacrylates.

The toughener should be free of cyanoacrylate polymerization-causing impurities. Without intending to be bound by theory, such impurities are believed to be salts (e.g., sodium chloride), soaps, or other nucleophilic species which typically are used in the manufacture of the toughener or present in the monomer mixture from which the toughener is made. Commercially available copolymers (e.g., core-shell copolymers) typically contain sufficiently high levels of such polymerization-causing impurities to render such copolymers undesirable for use in the present invention. However, through the treatment procedure described below, commercially available copolymers can be rendered sufficiently free of polymerization-causing impurities so that such treated copolymers can be used as tougheners in the present invention. Except for the treatment procedure, the means for preparing the toughener is well known in the art. References describing copolymers which are suitable for use as tougheners include U.S. Pat. Nos. 3,496,250, 3,655,825, 3,668,274 and 3,864,426. Preferred commercially available copolymers which can be used as is or treated as described below include "Blendex BTA III F", "Acryloid KM 680", "Acryloid KM 653", "Acryloid KM 611", and "Acryloid KM 330" copolymers, all of which are commercially available from Rohm and Haas Company, "Blendex 101" copolymer, commercially available from Borg-Warner Corp., "Metablen C 223" copolymer, commercially available from M & T Chemicals, Inc., and "Kane Ace-B" copolymer, commercially available from Kaneka America Corp. "Blendex 436" copolymer, formerly commercially available from Borg-Warner Corp., can also be treated to provide a suitable toughener.

If cyanoacrylate polymerization-causing impurities are present in the copolymer, the copolymer should be treated to remove them. A preferred treatment procedure employs extraction and an acidic wash, and can be carried out as follows. All washes are performed at 60° C. A 300 gram portion of solid, granulated copolymer is washed and filtered five times using 3.5 liter portions of deionized water. The filtercake is washed and filtered once using a solution of two milliliters of 28% hydrochloric acid in 3.5 liters of methanol, followed by washing and filtering four times with 3.5 liter portions of methanol. The filtercake is next washed once with water (this water wash step was not performed for all the examples shown below, but has been found to be useful in order to prevent caking and lump formation), filtered, and dried for 16 hours at 49° C. and about 60 millimeters Hg. Use of fewer than three water or methanol wash steps, or use of water wash alone, may fail to provide a sufficient degree of treatment.

The suitability of the treatment procedure chosen can be evaluated by combining cyanoacrylate monomer with about ten weight percent of the treated toughener, and observing whether or not the resulting mixture is shelf stable. If, owing to polymerization of the cyanoacrylate monomer, the viscosity of the mixture increases either rapidly or within an inconveniently short time, then further treatment of the toughener is required. Preferably, the viscosity of the mixture does not exceed about 30,000 cps when stored for three days at 71° C. Many commercially available copolymers contain chloride ion and basic groups, and the thoroughness of the toughener treatment can be further evaluated by monitoring the level of chloride ion (in ppm) and the basicity (in milliequivalents of KOH per gram) of the treated toughener. For example, commercially available samples of "Blendex BTA III F" terpolymer contain about 100 ppm by weight chloride ion, and have a basicity of about $10^{-3}$ milliequivalents of KOH per gram. A level of treatment sufficient to reduce the chloride ion concentration of "Blendex BTA III F" terpolymer to less than about 10 ppm and the basicity to less than about $10^{-4}$ milliequivalents of KOH per gram appears to be sufficient to provide the desired degree of shelf stability when the thus-treated toughener is combined with cyanoacrylate monomer.

The amount of toughener can be varied to suit particular applications. High level of toughener increase the viscosity of the resulting adhesive. A preferred amount of toughener is about 7 to 25 percent by weight, more preferably 15 to 25 percent by weight, based on the total weight of cyanoacrylate monomer, toughener and sustainer. Mixtures of tougheners can be used if desired.

The sustainer (the third ingredient) preserves and in some cases enhances the toughness of compositions containing cyanoacrylate monomer and toughener, especially after cured bonds made with such compositions are aged above room temperature. A suitable sustainer will enable compositions of the present invention to exhibit a high aged toughness (e.g., T-peel strength after aging of a cured bond for 14 days at 71° C.) and a "smooth peel" (progressive) failure mode, while a composition containing only cyanoacrylate monomer and toughener will have a lower aged toughness and a "zip" (catastrophic) or "zip-stick" (alternate catastrophic-smooth peel) failure mode. The manner in which the sustainer functions is not understood. Based on the work carried out to date, no fully satisfactory structural definition has been found for the sustainer. In general, the sustainer is an organic substance which is a liquid or solid at room temperature and atmospheric pressure. The sustainer is "cyanoacrylate-compatible", that is, it is soluble or miscible in the cyanoacrylate monomer and does not by itself initiate polymerization of the cyanoacrylate monomer. The sustainer also is "toughener-compatible", that is, it will swell or partially dissolve the toughener core. The following tests have been found to be helpful for selecting toughener-compatible sustainers, although it should be noted that some sustainers which do not appear to be toughener-compatible in the tests nonetheless function adequately in the present invention. The tests are useful in indicating which sustainers are likely to be toughener-compatible.

The first test is useful for selecting potential sustainers which are liquids at room temperature, and is carried out as follows. A one gram solid slab of test rubber whose structure corresponds (either exactly or approximately) to the structure of the toughener core is combined with twenty-five ml of potential sustainer. The extent to which the test rubber dissolves or swells in the potential sustainer is measured after three days at room temperature. The test rubber may wholly dissolve, in which case no solid test rubber will remain. The test rubber may partially dissolve (in which case the test-rubber will decrease in weight) and in such case swirling the mixture of test rubber and potential sustainer may reveal schlieren patterns. If the test rubber is not partially or wholly dissolved, it is removed from the potential sustainer, dipped in acetone, briefly dried, and weighed. For a toughener-compatible sustainer, the test rubber should dissolve or partially dissolve in the potential sustainer, or be swollen by about 50 weight percent or more. For an unsuitable potential sustainer, the test rubber typically will not dissolve or partially dissolve, and will swell by less than about 50 weight percent. Some unsuitable potential sustainers may appear to be toughener-compatible (and vice-versa) in this test, but based on the work carried out to date it appears to be a generally reliable predictor of toughener-compatibility.

The second test is carried out as follows. For a liquid potential sustainer, two grams of toughener granules (e.g., Blendex "BTA III F" terpolymer) are combined with ten milliliters of potential sustainer in a mixing vessel at room temperature and mixed with a spatula until a smooth mixture is obtained. For a solid potential sustainer, the potential sustainer is first melted, then 10 milliliters of molten sustainer are combined with toughener granules as described above. A toughener-compatible sustainer should swell or partially dissolve the toughener granules, yielding a high-viscosity (e.g., about 5,000 cps or more), opalescent mixture. An unsuitable potential sustainer typically will provide a low-viscosity, milky dispersion or a low-viscosity, visually clear mixture, or will fail to dissolve an appreciable portion of the toughener granules. Some sustainers (e.g., diethyl adipate) may appear to be unsuitable when evaluated using this test, but nonetheless function adequately in the invention. However, no sustainers have yet been found which appear to be toughener-compatible in this test and do not function adequately in the present invention.

A third test, modified for use in this invention and described below in Example 3, is a double-torsional fracture energy test. In such test (based on the work carried out to date), a test specimen containing a toughener-compatible sustainer will exhibit a fracture energy of $5 \times 10^6$ ergs/cm$^2$ or more and a controlled crack propagation (i.e., crack growth dependent upon a continual input of force).

A fourth test of toughener-compatibility is a peel strength test, in which cyanoacrylate monomer, toughener, and potential sustainer are combined, used to prepare a bond, and the bond then heat-aged for a desired period of time, evaluated for peel strength and compared to a similar bond made using a composition prepared without the potential sustainer. In such test, a toughener-compatible sustainer will provide higher aged peel strengths than compositions prepared without such sustainer, and will provide a smooth peel failure mode.

Preferred sustainers contain one or more unsubstituted or substituted aryl groups, and more preferably contain one or more substituted phenyl groups. Suitable substituents on such aryl groups include alkyl, aryl, alkaryl, aralkyl (e.g., tolyl), halo, alkoxy, aryloxy (e.g., phenoxy), nitro, cyano, alkylcarbonyl (e.g., acetyl), and aryloyl (e.g., benzoyl) groups. The sustainer should be free of substituents which are sufficiently nucleophilic or basic in nature to catalyze the polymerization of cyanoacrylate monomers. Sustainers which have been found to be useful include cumene, biphenyl, 4-bromobiphenyl, terphenyl, partially hydrogenated polyphenyl, diphenylmethane, 1,2-diphenoxyethane, bromobenzene, chlorobenzene, 4-bromochlorobenzene, 1,2-dichlorobenzene, 1,2,4-trichlorobenzene, 1,3-dimethoxybenzene, diphenyl ether, 4-bromophenyl phenyl ether, biphenylyl phenyl ethers, nitrobenzene, benzonitrile, acetophenone, fluorene, and diethyl adipate.

Several sustainers have been found to be useful with certain tougheners but not useful when combined with other tougheners. For example, 1,1-bis(3,4-dimethylphenyl)-ethane has been found to be useful with the MBS toughener "Blendex BTA III F", but not useful with the MBS toughener "Acryloid KM 611", the ABS toughener "Blendex 101", or the MABS toughener "Blendex 436". 1-Methylnaphthalene has been found to be useful with "Blendex BTA III F", "Acryloid KM 611", and "Blendex 436", but not with "Blendex 101". Benzophenone has been found to be useful with "Blendex BTA III F", "Acryloid KM 611", and "Blendex 101", but not with "Blendex 436". Tricresyl phosphate has been found to be useful with "Blendex BTA III F" and "Blendex 436", but not with "Acryloid KM 611" or "Blendex 101". 4-t-Butylphenyl diphenyl phosphate has been found to be useful with "Blendex BTA III F", "Acryloid KM 611" and "Blendex 436" but not with "Blendex 101". Butyl benzyl phthalate and "QM 657" (a 1:1 molar adduct of dicylopentadiene and hydroxyethyl methacrylate, commercially available from Rohm and Haas Co.) have been found to be useful with "Acryloid KM 330" acrylic copolymer.

Most of the sustainers mentioned above as being useful in the invention have not, to the best of our knowledge, been shown previously in the art in combination with cyanoacrylates. Some of the above-mentioned sustainers (e.g., diphenyl ether, tricresyl phosphate, 4-t-butylphenyl diphenyl phosphate, and butyl benzyl phthalate) are known for use as plasticizers in cyanoacrylate adhesives, although such plasticizers have not, to the best of our knowledge, been shown previously in the art in combination with cyanoacrylate adhesives containing the tougheners used in this invention.

The amount of sustainer can be varied to suit particular applications. High levels of sustainer can lower the bond strengths obtained using the resulting adhesive. A preferred amount of sustainer is about 2 to 25 percent by weight, more preferably 5 to 15 percent by weight, based on the total weight of cyanoacrylate monomer, toughener, and sustainer. Mixtures of sustainers can be used if desired.

Other known adjuvants for use in cyanoacrylate adhesives, such as thickeners, fillers, extenders, crosslinking agents, anionic polymerization inhibitors, radical stabilizers, adhesion promoters, heat resistance promoters, water resistance promoters, wetting agents, and the like can be included in compositions of the invention. The amounts and types of such adjuvants will be well known to those skilled in the art. It is particularly desirable to employ sulfur dioxide as an inhibitor in compositions of the invention, and to adjust its amount (generally between about 25 and 100 ppm based upon the weight of cyanoacrylate monomer) in order to compensate for lot-to-lot variations in the cleanliness of the treated toughener. Use of excess inhibitor can have an adverse effect upon long-term toughness.

The compositions of the invention can be mixed in any desired order. A preferred order of mixing is to combine the cyanoacrylate monomer and sustainer, followed by addition of the toughener. After a period of mixing during which the toughener preferably dissolves, partially dissolves, or swells, the composition of the invention will be ready for use. Compositions of the invention preferably are stored under anhydrous conditions in polyethylene containers with refrigeration being useful for maximum shelf life.

The compositions of the invention can be put up in one-part or two-part packages. In a one-part package, cyanoacrylate monomer, toughener, sustainer, and any desired adjuvants are combined in a single package. In a two-part package, cyanoacrylate monomer, toughener, sustainer, and any desired adjuvants are combined in a first part, and a cyanoacrylate polymerization catalyst (e.g., mild nucleophiles such as water, alcohols, tetrabutylammonium tetrafluoroborate, caffeine, and theobromine, other substances such as cycloaliphatic epoxides and 4,4'-diisocyanatodiphenylmethane or derivatives thereof, or other catalytic substances known to those skilled in the art), solvent, and any desired adjuvants are combined in a second part. The two parts mixed together just prior to use.

The following examples are offered to aid understanding of the present invention and are not to be construed as limiting the scope thereof.

EXAMPLE 1

A composition of the invention containing cyanoacrylate monomer, treated toughener, and sustainer was prepared by combining the ingredients shown below in Table I, Run 4, in the amounts indicated. Control compositions containing respectively cyanoacrylate monomer alone (Run 1), cyanoacrylate monomer and sustainer alone (Run 2), and cyanoacrylate and treated toughener alone (Run 3) were also prepared in the amounts indicated below in Table I. Each composition was prepared by mixing the indicated ingredients using a non-aerating stirrer (commercially available from Glas-Col Apparatus Co.) until a smooth dispersion was obtained, and storing the resulting dispersion in a polyethylene bottle (commercially available from Alpha Techno, Inc.) equipped with a dispensing nozzle.

Nine T-peel bonds were made with each adhesive using 25.4 mm by 203 mm by 0.45 mm dip-quenched aluminum-killed commercial bright ("DQAK-CB") cold rolled steel ("CRS") coupons. The surfaces of each coupon were prepared by acetone degreasing, 220 grit sandpaper abrading and acetone cleaning. Approximately 0.5 of adhesive was applied as a bead to one of the prepared coupons and the second coupon used to spread the adhesive evenly and form a bond with a thickness of about 0.01 to 0.025 mm. The coupons were held together with eight binder clips (No. 5 medium, commercially available from IDL Mfg. and Sales Corp.) for 16 hours at 23° C. Three samples of each adhesive were tested for T-peel strength using an "Instron" tensile tester model TM, operated at a jaw separation rate of 50.5 cm/min. The remaining samples were aged in a forced air oven for two weeks or four weeks at 71° C., removed from the oven, cooled to room temperature, and tested for peel strength. Peel strength values were computed from a visually-weighted average of the tensile tester force vs. crosshead travel curve. Set out below in Table I are the run number, amount of each ingredient, initial T-peel strength, T-peel strength after aging, and failure mode for each of Run Nos. 1 through 4. The failure modes observed are further explained in the notes to Table I.

TABLE I

| Run No. | Ingredient, parts | | | T-peel strength kg/cm width (failure mode[4]) | | |
|---|---|---|---|---|---|---|
| | | | | | Aged Bond | |
| | Cyanoacrylate[1] | Toughener[2] | Sustainer[3] | Initial | 2 weeks | 4 weeks |
| 1 | 100 | — | — | 2.5(ZS) | 0.9(Z) | 1.1(ZS) |
| 2 | 100 | — | 10 | 3.2(ZS) | 1.6(Z) | 1.4(ZS) |
| 3 | 100 | 30 | — | 7.3(SP) | 3.0(ZS) | 4.3(ZS) |
| 4 | 100 | 30 | 10 | 8.2(SP) | 8.7(SP) | 8.2(SP) |

[1]ethyl cyanoacrylate monomer ("CA-3" adhesive, commercially available from 3M), modified by the addition of 0.1 weight percent gallic acid as adhesion promoter.
[2]Methacrylate-styrene-butadiene emulsion terpolymer ("Blendex BTA III F" terpolymer, commercially available from Rohm and Haas Company) cleaned as follows (all washes were performed at 60° C.): a 300 gram portion of terpolymer was washed five times with 3.5 liter portions of deionized water. The filtercake was washed once with a solution of 2 milliliters of 28% hydrochloric acid in 3.5 liters of methanol, followed by washing and filtering four times with 3.5 liter portions of methanol. The filtercake was dried for 16 hours at 49° C. and about 60 millimeters Hg.
[3]Diphenylmethane
[4]Key to failure mode:
Z = Zip, an uncontrolled catastrophic cleavage of the adhesive layer.
ZS = Zip-stick, an alternate zip and controlled (smooth peel) failure
SP = Smooth peel, a controlled progressive failure of the adhesive layer.

This example shows the improvement obtained by combining cyanoacrylate, toughener, and sustainer. If cyanoacrylate alone was employed, initial and aged peel strengths were very low. Addition to cyanoacrylate of sustainer alone provided a minor improvement in initial peel strength and aged peel strength. Addition to cyanoacrylate of toughener alone offered an initial improvement in peel strength which largely disappeared after aging. Addition to cyanoacrylate of both toughener and sustainer provided high initial and durable long term peel strength. After 4 weeks of aging, the peel strength of Run 4 was nearly two times that obtained by the use of toughener alone, nearly six times that obtained by the use of sustainer alone, and over seven times that obtained through the use of cyanoacrylate alone. In addition, Run 4 samples exhibited a desirable smooth peel failure mode (accompanied by uniform whitening of the fractured bond line, indicative of extensive energy absorption), whereas Runs 1–3 exhibited undesirable zip or zip-stick failure (accompanied by a specular, or specular-striated fractured bond line, indicative of low energy absorption).

The difference between the performance of aged Run 4 samples and aged Runs 1–3 samples in relatively dramatic, and can be appreciated without the use of sophisticated test equipment. For example, the samples can be grasped and pulled apart by hand. The samples of Runs 1 and 2 separate readily and catastrophically under slight manual tension, without any bending of the coupons. Run 3 samples initially separate and bend slightly under moderate manual tension, then suddenly break apart throughout the remainder of the bond without further coupon bending. Run 4 samples separate only under very high sustained manual tension (enough force is required that care must be taken to prevent cutting one's hands on the coupon edges) and result in bending of the coupons into evenly curved arcs.

EXAMPLE 2

Treatment of Toughener

In a series of runs, commercially purchased "Blendex BTA-III F" terpolymer was combined with ethyl cyanoacrylate monomer ("CA8-3A" adhesive, containing an adhesion promoter of unknown structure, manufactured by Alpha Techno, Inc.) and a sustainer. In Run 1, the terpolymer was untreated, that is, used as received. In Run 2, a treated toughener was prepared from the terpolymer using the treatment method of Example 1. In Runs 3 through 8, varying amounts of sodium chloride, ranging from 250 ppm down to 5 ppm, were dissolved in water, the resulting salt solution sprinkled on the treated terpolymer, and the water removed by drying. For each run, the time to gelation was evaluated visually. For Runs 1 and 3–7, gelation occurred within a relatively short period of time at room temperature. For Runs 2 and 8, gelation did not occur readily at room temperature, so gelation resistance for these two runs was evaluated under accelerated conditions by heating to 71° C.

Each run contained 72.5 weight percent cyanoacrylate monomer, 14.8 weight percent terpolymer or treated toughener, 11.2 weight percent 1,2-dichlorobenzene, and 25 ppm sulfur dioxide (in addition to the sulfur dioxide already present in the cyanoacrylate monomer). Set out below in Table II are the run no., run description (i.e., whether the terpolymer was untreated, treated, or treated and modified by addition of sodium chloride), aging temperature, and gelation time for each of Runs 1 through 8.

TABLE II

| Run No. | Run description | Aging temp. | Gelation time |
|---|---|---|---|
| 1 | untreated | 24° C. | 30 minutes |
| 2 | treated | 71° C. | >48 hours |
| 3 | +250 ppm NaCl | 24° C. | 4 hours |
| 4 | +50 ppm NaCl | 24° C. | 4 hours |
| 5 | +30 ppm NaCl | 24° C. | <16 hours |
| 6 | +20 ppm NaCl | 24° C. | <16 hours |
| 7 | +10 ppm NaCl | 24° C. | <48 hours |
| 8 | +5 ppm NaCl | 71° C. | >48 hours |

This example shows that toughener which has been treated by washing to remove gelation-causing impurities provided substantially better shelf stability than a commercially available terpolymer which had not been so treated. Addition of about 10 ppm or more of sodium chloride to treated toughener caused a drastic decrease in shelf stability, indicating that sodium chloride or other ionic species present in the untreated terpolymer may be responsible for the poor shelf stability observed when the untreated terpolymer is combined with cyanoacrylate monomer.

EXAMPLE 3 AND COMPARISON EXAMPLE 1

Double Torsional Fracture Energy Test

In a series of runs, cyanoacrylate monomer ("CA-3" adhesive), treated toughener ("Blendex BTA III F" terpolymer, treated as in Example 1), and a variety of sustainers or comparison materials were combined. The resulting adhesive compositions were cured into slabs using polyethylene molds whose inner surfaces were sprayed with a 1 weight percent solution of caffeine in acetone. The cured slabs were removed from the mold after 24 hours at room temperature, and aged for eight hours at 93° C. Next, the slabs were evaluated to determine the fracture energy (in ergs/cm$^2$) required to propagate a crack through the cured slabs. The slabs were machined into rectangular prisms 0.48 cm thick by 3 cm wide by 7 cm long. A 0.24 cm deep by 0.16 cm wide by 7 cm long groove was machined down the long axis of a 3 cm by 7 cm face of each slab. Viewed endwise, each slab had two 0.48 cm by 3 cm notched faces at opposite ends of the groove. A razor blade was used to initiate a sharp crack in one 0.48 cm by 3 cm notched end of each slab. The crack bisected the bottom of the groove and was oriented perpendicular thereto.

Each slab, prepared as described above, was placed with its grooved side facing a testing fixture made from two 7.5 cm long aluminum stanchions spaced 2.5 cm apart, mounted on a compression load cell in an "Instron" tensile tester. Each slab was oriented so that its groove was centered over and aligned with the space between the stanchions. An indentor having a 0.64 cm diameter ball bearing mounted on one end was fastened at its other end to the crosshead. The ball end was forced into the side of the slab opposite the groove, adjacent to the razor-notched end, using a crosshead rate of 0.5 cm/min. The indentor was advanced toward the load cell (i.e., in the direction of the grooved face of the slab) by the crosshead, causing a crack to propagate down the length of the slab, guided in its propagation by the groove. A plot of crosshead force (in dynes) versus crosshead travel (in centimeters) was recorded. The area under the curve was integrated to provide a measurement of the total energy (in ergs) required to propagate the crack. The crack propagation energy was then divided by the area of the crack face (i.e., 0.25 cm by 7 cm) to provide a measurement of fracture energy expressed in ergs/cm$^2$. The crack propagation was evaluated as "controlled" or "uncontrolled", based on whether the crack propagated slowly as the crosshead advanced, or catastrophically after initial crosshead contact.

Set out below in Table III are the run number, the amount of cyanoacrylate monomer, toughener, and sustainer, the fracture energy, and the failure mode for three control samples and several compositions of the present invention. Set out below in Table IV are the run number, the amount of cyanoacrylate monomer, toughener, and comparison material, the fracture energy, and the failure mode for several comparison compositions not of this invention. Runs 8, 12 and 13 from Table III and Runs 3 and 4 from Table IV employed 0.48 cm by 3 cm by 6 cm sample slabs.

promoter, was tested for T-peel resistance. The test was carried out using 25.4 mm by 203 mm by 0.45 mm DQAK-CB CRS coupons. Prior to bonding, the coupons were cleaned for ten minutes in a 71° C. solution of "Oakite No. 164" aluminum cleaner (commercially available from Oakite Products, Inc.), rinsed in water, stored in acetone, and wiped with an acetone-soaked cheesecloth immediately before use. Six cured bond assemblies were made using the method of Example 1 and allowed to cure for 16 to 72 hours at room temperature. Two cured bond assemblies were tested to determine their initial T-peel strength, and the remaining cured bond assemblies were aged for one day or seven days at 71° C., then tested to determine their T-peel strength.

A control composition containing only cyanoacrylate monomer, treated toughener, and gallic acid (Comparative Example 2) was prepared, together with two further control compositions in which octyl cyanoacetate

TABLE III

| Run No. | Ingredient, Parts | | | Sustainer | Fracture energy, ergs/cm$^2$ | Crack Propagation |
|---|---|---|---|---|---|---|
| | Cyanoacrylate | Toughener | Sustainer | | | |
| 1 | 100 | — | — | — | $2.1 \times 10^4$ | U |
| 2 | 85 | 15 | — | — | $3.1 \times 10^4$ | U |
| 3 | 75 | 15 | 10 | partially hydrogenated polyphenyl[1] | $5.2 \times 10^6$ | C |
| 4 | 73 | 20 | 7 | diphenylmethane | $2.0 \times 10^7$ | C |
| 5 | 75 | 15 | 10 | diphenylmethane | $1.2 \times 10^7$ | C |
| 6 | 75 | 15 | 10 | 1,2-diphenoxyethane | $2.1 \times 10^7$ | C |
| 7 | 75 | 15 | 10 | 1-methylnaphthalene | $8.5 \times 10^6$ | C |
| 8 | 75 | 15 | 10 | 1,2,4-trichlorobenzene | $8.0 \times 10^6$ | C |
| 9 | 75 | 15 | 10 | 1,3-dimethoxybenzene | $1.4 \times 10^7$ | C |
| 10 | 90 | — | 10 | diphenyl ether | $2.0 \times 10^4$ | U |
| 11 | 75 | 15 | 10 | diphenyl ether | $1.5 \times 10^7$ | C |
| 12 | 75 | 15 | 10 | mixture of phenyl ether and biphenylyl phenyl ethers[2] | $1.0 \times 10^7$ | C |
| 13 | 75 | 15 | 10 | acetophenone | $2.1 \times 10^7$ | C |
| 14 | 75 | 15 | 10 | benzophenone | $1.2 \times 10^7$ | C |
| 15 | 75 | 15 | 10 | fluorene | $1.3 \times 10^7$ | C |
| 16 | 75 | 15 | 10 | diethyl adipate | $6.9 \times 10^6$ | C |

[1] "XA-2020" commercially available from Monsanto Co.
[2] "Dowtherm G", commercially available from Dow Chemical Co.

TABLE IV

| Run No. | Ingredient, Parts | | | Comparison material | Fracture energy, ergs/cm$^2$ | Crack Propagation |
|---|---|---|---|---|---|---|
| | Cyanoacrylate | Toughener | Comparison material | | | |
| 1 | 75 | 15 | 10 | diphenyl carbonate | $9.5 \times 10^6$ | U |
| 2 | 75 | 15 | 10 | 2-phenoxyethanol | $3.7 \times 10^6$ | U |
| 3 | 75 | 15 | 10 | diphenyl phthalate | $2.0 \times 10^6$ | U |
| 4 | 75 | 15 | 10 | dibenzyl sebacate | $5.1 \times 10^6$ | U |
| 5 | 75 | 15 | 10 | fluorenone | $2.6 \times 10^6$ | U |
| 6 | 75 | 15 | 10 | dibenzofuran | $5.5 \times 10^6$ | U |

This Example and Comparative Example illustrate the use of a variety of sustainers in the present invention. In general, toughener-compatible sustainers provided a controlled crack propagation, with fracture energies of about $5 \times 10^6$ ergs/cm$^2$ or more. Some runs exhibited fracture energies of $10^7$ ergs/cm or more, a $10^3$-fold improvement over the results obtained with the use of cyanoacrylate alone, cyanoacrylate plus toughener alone, or cyanoacrylate plus diphenyl ether alone.

EXAMPLE 4 AND COMPARISON EXAMPLES 2-4

The composition of Example 3, run 11, modified by the addition of 0.1 parts by weight gallic acid adhesion (Comparative Example 3) or butyl benzyl phthalate (Comparative Example 4) were substituted for the diphenyl ether used in Example 4. The resulting Comparative Example compositions were tested as described above.

Set out below in Table V are the Example number or the Comparative Example number, identity of the sustainer or comparison material, and the T-peel strength and failure mode measured initially and after one day or seven days aging at 71° C.

TABLE V

| Ex. No. or Comp. Ex. No. | Sustainer or comparison material | T-Peel strength kg/cm width (failure mode) | | |
|---|---|---|---|---|
| | | Initial | Aged 1 day at 71° C. | Aged 7 days at 71° C. |
| Ex. 4 | diphenyl ether | 5.4(SP) | 7.2(SP) | 6.6(SP) |
| Comp. Ex. 2 | — | 6.3(SP) | 0.9-4.5(ZS) | 0.4-4.3(ZS) |
| Comp. Ex. 3 | n-octyl cyanoacetate | 6.3(SP) | 0.5-4.8(ZS) | 0-0.5(Z) |
| Comp. Ex. 4 | butyl benzyl phthalate | (0.5-7(ZS) | 1.3-5.4(ZS) | 0.5-5.5(ZS) |

This example shows that diphenyl ether as used in Example 4 provided sustained high peel strength and controlled fracture behavior, advantages not offered by the compositions of Comparative Examples 2 through 4.

EXAMPLE 5

Sustainer Swell Testing

Approximate 25 ml samples of several liquid sustainers and comparison materials were combined with approximate 1.5 gram, generally cubic slabs of two solid test rubbers. The resulting combinations were allowed to stand for three days at room temperature. In some instances the test rubber completely or partially dissolved. In the remaining instances, the test rubber swelled, and the extent of swelling was measured by rinsing the swollen test rubber, in acetone, allowing the acetone to drain from the swollen rubber, and weighing to determine the amount of weight gain.

Set out below in Table VI are the run no., identity of the sustainer or comparison material, and the effect of the sustainer upon the test rubbers.

TABLE VI

| Run No. | Sustainer or comparison material | Percent weight gain | |
|---|---|---|---|
| | | Test rubber A[1] | Test rubber B[2] |
| 1 | cumene | D[3] | d[4] |
| 2 | partially hydrogenated polyphenyl[5] | 52.3 | 83.3 |
| 3 | diphenylmethane | D | d |
| 4 | 1,1-bis(3,4-dimethylphenyl)ethane | 125 | 122 |
| 5 | 1-methylnaphthalene | d | d |
| 6 | bromobenzene | D | D |
| 7 | chlorobenzene | D | D |
| 8 | 1,2-dichlorobenzene | D | D |
| 9 | 1,2,4-trichlorobenzene | D | d |
| 10 | 1,3-dimethoxybenzene | 128 | 148 |
| 11 | diphenyl ether | d | 128 |
| 12 | 4-bromophenyl phenyl ether | 114 | 197 |
| 13 | Mixture of phenyl ether and biphenylyl phenyl ethers[6] | 112 | 101 |
| 14 | nitrobenzene | D | 111 |
| 15 | benzonitrile | d | 118 |
| 16 | acetophenone | D | 105 |
| 17 | tricresyl phosphate | 8.0 | 10.0 |
| 18 | 4-t-butylphenyl diphenyl phosphate | 11.7 | 7.1 |
| 19 | butyl benzyl phthalate | 10.7 | 10.9 |
| 20 | n-butyl cyanoacetate | 2.4 | 4.1 |
| 21 | dioctyl phthalate | 36.8 | 37.2 |
| 22 | diethyl succinate | 34.7 | 26.2 |
| 23 | diethyl adipate | 64.7 | 47.9 |
| 24 | dimethyl sebacate | 69.1 | 46.0 |
| 25 | dibenzyl sebacate | 25.5 | 15.6 |
| 26 | 2-phenoxyethanol | 4.3 | 4.3 |

[1]"Plioflex 1502", styrene-butadiene rubber (23.5 wt. % bound styrene), commercially available from Goodyear Tire and Rubber Co.
[2]"Intene 50", polybutadiene rubber, commercially available from International Synthetic Rubber Co.
[3]D = Completely dissolved the test rubber.
[4]d = Partially dissolved the test rubber.
[5]"XA-2020".
[6]"Dowtherm G".

Test rubber A is believed to approximate the structure of the core of the MBS terpolymer "Blendex BTA III F". Test rubber B is believed to approximate the structure of the core of the ABS terpolymer "Blendex 101". In general, those runs in Table VI in which the percent weight gain of Test rubber A is more than 50 weight percent (or a "D" or "d" value) are indicative of toughener-compatibility if the tested sustainer is combined with "Blendex BTA III F" terpolymer. Similarly, those runs in Table VI in which the percent weight gain of Test rubber B is more than 50 weight percent (or a "D" or "d" value) are indicative of toughener-compatibility if the tested sustainer is combined with "Blendex 101" copolymer, with Run nos. 4 and 5 being exceptions to the latter general rule.

EXAMPLE 6

Using the method of Example 1, several treated tougheners and sustainers were combined with cyanoacrylate monomer ("CA-3" adhesive, modified by the inclusion of 0.1 weight percent tannic acid as adhesion promoter), and the resulting composition then evaluated for T-peel strength when applied to 25.4 mm by 203 mm by 1.02 mm 3003-0 aluminum alloy strips. Prior to bonding, each strip was cleaned using an "FPL Etch" procedure carried out as follows. Each strip was immersed for ten minutes in a 71° C. solution of "Oakite No. 164" aluminum cleaner, rinsed in tap water for one minute, immersed for ten minutes in a 71° C. chromic-sulfuric acid bath (prepared from 30 parts water, 10 parts concentrated $H_2SO_4$, and 1 part sodium dichromate), rinsed for two minutes in tap water, air dried for ten minutes, and dried in a forced air oven for ten minutes at 71° C. Control compositions were prepared without sustainer. Bond thickness was regulated at about 0.04 mm by including 0.04 mm glass beads in the bondline.

Set out below in Table VII are the run number, type and amount (in weight percent) of toughener, type and amount (in weight percent) of sustainer, and the T-peel strength for the resulting compositions measured initially (after a two day cure at room temperature) and after aging for two days or five days at 93° C. or for fourteen days at 71° C.

TABLE VII

| Run No. | Toughener Type | Toughener Amount, wt. % | Sustainer Type | Sustainer Amount, wt. % | T-Peel strength, kg/cm width Initial | Aged 2 days at 93° C. | Aged 5 days at 93° C. | Aged 14 days at 71° C. |
|---|---|---|---|---|---|---|---|---|
| 1 | MBS-1[1] | 15 | — | — | 6.7 | 3.9 | 3.7 | 4.2 |
| 2 | MBS-2[2] | 15 | — | — | 4.7 | 2.9 | 2.7 | 2.1 |
| 3 | ABS[3] | 15 | — | — | 6.4 | 4.1 | 3.8 | 3.9 |
| 4 | MABS[4] | 12 | — | — | 5.4 | 4.0 | 4.4 | 4.6 |
| 5 | MBS-1 | 15 | cumene | 12.5 | 5.9 | 5.0 | 4.6 | 4.9 |
| 6 | MBS-1 | 15 | biphenyl | 12.5 | 8.6 | 7.4 | 7.0 | 7.3 |
| 7 | MBS-2 | 15 | biphenyl | 12.5 | 4.9 | 4.8 | 4.2 | 4.7 |
| 8 | ABS | 15 | biphenyl | 12.5 | 5.5 | 5.1 | 5.1 | 5.2 |
| 9 | MABS | 12 | biphenyl | 10 | 6.4 | 6.3 | 5.3 | 5.9 |
| 10 | MBS-1 | 15 | 4-bromobiphenyl | 12.5 | 7.0 | 6.9 | 6.7 | 6.3 |
| 11 | MBS-1 | 15 | terphenyl | 12.5 | 5.2 | 5.2 | 5.3 | 5.0 |
| 12 | MBS-1 | 15 | partially hydrogenated polyphenyl[5] | 12.5 | 6.3 | 5.1 | 5.5 | 5.4 |
| 13 | MBS-1 | 15 | diphenylmethane | 12.5 | 7.1 | 6.3 | 6.5 | 6.4 |
| 14 | MBS-2 | 15 | diphenylmethane | 12.5 | 5.0 | 4.7 | 4.5 | 4.6 |
| 15 | ABS | 15 | diphenylmethane | 12.5 | 5.7 | 5.4 | 5.2 | 5.6 |
| 16 | MABS | 12 | diphenylmethane | 10 | 6.1 | 5.2 | 5.1 | 5.4 |
| 17 | MBS-1 | 15 | 1,1-bis(3,4-dimethylphenyl)ethane | 12.5 | 6.8 | 5.4 | 5.6 | 5.5 |
| 18 | MBS-1 | 15 | 1-methylnaphthalene | 12.5 | 7.6 | 6.4 | 6.8 | 6.4 |
| 19 | MBS-2 | 15 | 1-methylnaphthalene | 12.5 | 5.0 | 4.2 | 3.9 | 3.9 |
| 20 | MABS | 12 | 1-methylnaphthalene | 10 | 5.7 | 5.4 | 5.1 | 4.9 |
| 21 | MBS-1 | 15 | bromobenzene | 12.5 | 8.4 | 6.9 | 7.4 | 7.5 |
| 22 | MBS-1 | 15 | chlorobenzene | 12.5 | 8.0 | 6.9 | 7.3 | 6.4 |
| 23 | MBS-2 | 15 | chlorobenzene | 12.5 | 5.2 | 4.8 | 4.5 | 4.8 |
| 24 | ABS | 15 | chlorobenzene | 12.5 | 5.9 | 5.7 | 5.5 | 5.6 |
| 25 | MABS | 12 | chlorobenzene | 10 | 6.4 | 6.5 | 6.1 | 6.3 |
| 26 | MBS-1 | 15 | 4-bromochlorobenzene | 12.5 | 7.6 | 6.3 | 6.3 | 6.4 |
| 27 | MBS-2 | 15 | 4-bromochlorobenzene | 12.5 | 5.8 | 4.7 | 4.8 | 4.8 |
| 28 | ABS | 15 | 4-bromochlorobenzene | 12.5 | 6.1 | 5.7 | 5.4 | 5.6 |
| 29 | MABS | 12 | 4-bromochlorobenzene | 10 | 6.6 | 6.3 | 5.4 | 5.2 |
| 30 | MBS-1 | 15 | 1,2-dichlorobenzene | 12.5 | 8.0 | 7.4 | 7.4 | 7.2 |
| 31 | MBS-2 | 15 | 1,2-dichlorobenzene | 12.5 | 5.8 | 5.5 | 5.3 | 5.3 |
| 32 | ABS | 15 | 1,2-dichlorobenzene | 12.5 | 5.8 | 5.7 | 5.7 | 5.5 |
| 33 | MABS | 12 | 1,2-dichlorobenzene | 10 | 5.4 | 5.4 | 5.3 | 4.3 |
| 34 | MBS-2 | 15 | 1,2,4-trichlorobenzene | 12.5 | 5.3 | 4.3 | 4.5 | 4.9 |
| 35 | ABS | 15 | 1,2,4-trichlorobenzene | 12.5 | 5.8 | 5.4 | 5.0 | 5.0 |
| 36 | MABS | 12 | 1,2,4-trichlorobenzene | 10 | 5.5 | 5.1 | 5.7 | 5.4 |
| 37 | MBS-2 | 15 | 1,3-dimethoxybenzene | 12.5 | 5.6 | 5.7 | 5.3 | 4.7 |
| 38 | ABS | 15 | 1,3-dimethoxybenzene | 12.5 | 5.0 | 6.2 | 5.5 | 5.5 |
| 39 | MABS | 12 | 1,3-dimethoxybenzene | 10 | 5.8 | 5.8 | 5.4 | 5.4 |
| 40 | MBS-1 | 15 | diphenyl ether | 12.5 | 7.5 | 6.7 | 6.9 | 6.3 |
| 41 | MBS-2 | 15 | diphenyl ether | 12.5 | 5.4 | 5.0 | 4.6 | 4.9 |
| 42 | ABS | 15 | diphenyl ether | 12.5 | 5.9 | 5.8 | 5.4 | 5.4 |
| 43 | MABS | 12 | diphenyl ether | 10 | 5.4 | 5.4 | 5.1 | 4.6 |
| 44 | MBS-1 | 15 | 4-bromophenyl phenyl ether | 12.5 | 7.7 | 6.9 | 6.5 | 6.3 |
| 45 | MBS-1 | 15 | mixture of phenyl ether and biphenylyl phenyl ethers[6] | 12.5 | 5.4 | 5.0 | 5.4 | 5.4 |
| 46 | MBS-1 | 15 | nitrobenzene | 12.5 | 8.1 | 7.3 | 6.9 | 7.9 |
| 47 | MBS-2 | 15 | nitrobenzene | 12.5 | 5.1 | 5.4 | 5.4 | 5.3 |
| 48 | ABS | 15 | nitrobenzene | 12.5 | 6.0 | 6.3 | 5.6 | 5.7 |
| 49 | MABS | 12 | nitrobenzene | 10 | 6.7 | 7.0 | 6.6 | 5.4 |
| 50 | MBS-1 | 15 | benzonitrile | 12.5 | 7.9 | 5.9 | 5.7 | 8.4 |
| 51 | MBS-1 | 15 | acetophenone | 12.5 | 7.5 | 6.3 | 4.2 | 7.5 |
| 52 | MBS-2 | 15 | acetophenone | 12.5 | 5.1 | 4.5 | 4.5 | 5.1 |
| 53 | ABS | 15 | acetophenone | 12.5 | 5.5 | 5.4 | 5.0 | 5.9 |
| 54 | MABS | 12 | acetophenone | 10 | 6.9 | 5.9 | 5.0 | 6.3 |
| 55 | MBS-1 | 15 | benzophenone | 12.5 | 7.9 | 7.7 | 7.7 | 8.5 |
| 56 | MBS-2 | 15 | benzophenone | 12.5 | 4.9 | 5.4 | 5.2 | 4.4 |
| 57 | ABS | 15 | benzophenone | 12.5 | 5.3 | 6.5 | 5.3 | 4.6 |
| 58 | MBS-1 | 15 | tricresyl phosphate | 12.5 | 3.8 | 6.1 | 6.3 | 5.0 |
| 59 | MABS | 12 | tricresyl phosphate | 10 | 6.7 | 6.0 | 6.3 | 5.6 |
| 60 | MBS-1 | 15 | 4-t-butylphenyl diphenyl phosphate | 12.5 | 5.9 | 7.4 | 7.7 | 5.5 |
| 61 | MBS-2 | 15 | 4-t-butylphenyl diphenyl phosphate | 12.5 | 4.4 | 4.3 | 4.3 | 3.2 |
| 62 | MABS | 12 | 4-t-butylphenyl diphenyl phosphate | 10 | 7.4 | 6.9 | 6.8 | 6.5 |
| 63 | MBS-1 | 15 | diphenylmethane 1,2-dichlorobenzene | 6.25 6.25 | 6.6 | 6.1 | 6.6 | 6.3 |
| 64 | MBS-1 | 15 | 4-bromochlorobenzene benzophenone | 6.25 6.25 | 6.6 | 6.6 | 7.1 | 6.7 |
| 65 | MBS-1 | 15 | acetophenone 4-t-butylphenyl | 6.25 | 7.9 | 7.5 | 7.5 | 6.8 |

TABLE VII-continued

| Run No. | Toughener Type | Amount, wt. % | Sustainer Type | Amount, wt. % | T-Peel strength, kg/cm width | | |
|---|---|---|---|---|---|---|---|
| | | | | | Initial | Aged 2 days at 93° C. | Aged 5 days at 93° C. | Aged 14 days at 71° C. |
| | | | diphenyl phosphate | 6.25 | | | | |

(1)"Blendex BTA III F" MBS terpolymer, commercially available from Rohm and Haas Co., treated using the method of Example 1.
(2)"Acryloid KM 611" MBS terpolymer, commercially available from Rohm and Haas Co., treated using the method of Example 1.
(3)"Blendex 101" ABS terpolymer, commercially available from Borg Warner Corp., treated using the method of Example 1.
(4)"Blendex 436" MABS copolymer, formerly commercially available from Borg Warner Corp., treated using the method of Example 1.
(5)"XA-2020".
(6)"Dowtherm G".

The improvement provided in the present invention can be appreciated by comparing aged peel strengths for each run to aged peel strengths for a corresponding control from Run Nos. 1, 2, 3, or 4. This example illustrates the use of varying amounts of several tougheners and sustainers, and the effect of sustainer selection upon peel strength retention.

COMPARISON EXAMPLE 5

Using the method of Example 6, several comparison materials were combined with the cyanoacrylate monomer and treated tougheners used in Example 4 and evaluated for T-peel strength. Set out below in Table VIII are the run number, type and amount (in weight percent) of toughener, type and amount (in weight percent) of comparison material, and the T-peel strength for the resulting compositions (and for Run Nos. 1-4 of Table VII, as controls), measured initially and after aging for two days or five days at 93° C. or for 14 days at 71° C.

invention (as can be seen by comparison with a corresponding control shown in Run nos. 1, 2, 3, or 4). Note that several comparison materials (e.g., those of Run nos. 5-12) do function as sustainers in the present invention if combined with a toughener with which they are compatible, as can be seen by inspection of corresponding Run nos. 17-20 and 55-62 in Table VII.

EXAMPLE 7

In a series of runs and comparison runs, several commercially available cyanoacrylate monomers (modified by the addition of 0.1 weight percent tannic acid as adhesion promoter) were combined with various treated tougheners, sustainers, and comparison materials. Control compositions containing only cyanoacrylate monomer and treated toughener were also prepared. The resulting compositions were evaluated for T-peel strength using the method of Example 6.

Set out below in Table IX are the run number, cyanoacrylate monomer identity and amount, toughener iden-

TABLE VIII

| Run No. | Toughener Type | Amount, wt. % | Comparison material Type | Amount, wt. % | T-Peel strength, kg/cm width | | | |
|---|---|---|---|---|---|---|---|---|
| | | | | | Initial | Aged 2 days at 93° C. | Aged 5 days at 93° C. | Aged 14 days at 71° C. |
| 1 | MBS-1 | 15 | — | — | 6.7 | 3.9 | 3.7 | 4.2 |
| 2 | MBS-2 | 15 | — | — | 4.7 | 2.9 | 2.7 | 2.1 |
| 3 | ABS | 15 | — | — | 6.4 | 4.1 | 3.8 | 3.9 |
| 4 | MABS | 12 | — | — | 5.4 | 4.0 | 4.4 | 4.6 |
| 5 | MBS-2 | 15 | 1,1-bis(3,4-dimethylphenyl)ethane | 12.5 | 3.5 | 2.9 | 2.9 | 3.2 |
| 6 | ABS | 15 | 1,1-bis(3,4-dimethylphenyl)ethane | 12.5 | 5.3 | 4.4 | 3.8 | 4.3 |
| 7 | MABS | 12 | 1,1-bis(3,4-dimethylphenyl)ethane | 10 | 4.8 | 4.6 | 4.4 | 4.0 |
| 8 | ABS | 15 | 1-methylnaphthalene | 12.5 | 5.3 | 4.4 | 3.8 | 4.3 |
| 9 | MABS | 12 | benzophenone | 10 | 5.1 | 4.7 | 4.5 | 4.7 |
| 10 | MBS-2 | 15 | tricresyl phosphate | 12.5 | 3.8 | 3.2 | 3.6 | 3.8 |
| 11 | ABS | 15 | tricresyl phosphate | 12.5 | 5.8 | 2.9 | 2.9 | 3.0 |
| 12 | ABS | 15 | t-butylphenyl diphenyl phosphate | 12.5 | 5.8 | 3.0 | 2.0 | 2.8 |
| 13 | MBS-1 | 15 | butyl benzyl phthalate | 12.5 | 2.3 | 5.4 | 3.7 | 2.9 |
| 14 | MBS-2 | 15 | butyl benzyl phthalate | 12.5 | 2.9 | 3.2 | 3.4 | 2.8 |
| 15 | ABS | 15 | butyl benzyl phthalate | 12.5 | 5.1 | 3.0 | 2.9 | 3.1 |
| 16 | MABS | 12 | butyl benzyl phthalate | 10 | 4.3 | 4.6 | 3.8 | 3.1 |
| 17 | MBS-1 | 15 | n-butyl cyanoacetate | 12.5 | 6.7 | 3.7 | 2.1 | 6.3 |

This comparison example illustrates several combinations of cyanoacrylate monomer, toughener, and comparision material which are ineffective in the present tity and amount, sustainer or comparison material identity and amount, and the T-peel strength for the resulting compositions.

TABLE IX

| Run no. | Cyanoacrylate monomer Type | Amount, wt. % | Toughener Type | Amount, wt. % | Sustainer or Comparison Material Type | Amount, wt. % | T-Peel strength Kg/cm width | | | |
|---|---|---|---|---|---|---|---|---|---|---|
| | | | | | | | Initial | Aged 2 days at 93° C. | Aged 5 days at 93° C. | Aged 14 days at 71° C. |
| 1 | 1741(1) | 85 | MBS-1 | 15 | — | — | 6.3 | 4.1 | 3.8 | 3.0 |
| 2 | 1741 | 72.5 | MBS-1 | 15 | diphenylmethane | 12.5 | 6.8 | 6.2 | 6.1 | 6.8 |
| 3 | 1741 | 72.5 | MBS-1 | 15 | 1,2-dichlorobenzene | 12.5 | 7.7 | 7.2 | 7.4 | 7.3 |
| 4 | 1741 | 72.5 | MBS-1 | 15 | acetophenone | 12.5 | 7.5 | 6.5 | 6.1 | 6.6 |
| 5 | B-20(2) | 85 | MBS-1 | 15 | — | — | 8.0 | 5.7 | 5.0 | 4.5 |

TABLE IX-continued

| Run no. | Cyanoacrylate monomer Type | Amount, wt. % | Toughener Type | Amount, wt. % | Sustainer or Comparison Material Type | Amount, wt. % | T-Peel strength Kg/cm width Initial | Aged 2 days at 93° C. | Aged 5 days at 93° C. | Aged 14 days at 71° C. |
|---|---|---|---|---|---|---|---|---|---|---|
| 6 | B-20 | 72.5 | MBS-1 | 15 | diphenylmethane | 12.5 | 7.4 | 4.1 | 3.9 | 7.0 |
| 7 | B-20 | 72.5 | MBS-1 | 15 | 1,2-dichlorobenzene | 12.5 | 8.7 | 6.5 | 5.8 | 8.2 |
| 8 | B-20 | 72.5 | MBS-1 | 15 | acetophenone | 12.5 | 8.8 | 6.4 | 5.1 | 7.5 |
| 9 | CA-7[3] | 85 | MBS-1 | 15 | — | — | 3.4 | 3.7 | 1.6 | 3.4 |
| 10 | CA-7 | 72.5 | MBS-1 | 15 | diphenylmethane | 12.5 | 4.6 | 2.8 | 1.9 | 3.0 |
| 11 | CA-7 | 72.5 | MBS-1 | 15 | 1,2-dichlorobenzene | 12.5 | 4.9 | 3.7 | 3.4 | 3.9 |
| 12 | CA-7 | 72.5 | MBS-1 | 15 | acetophenone | 12.5 | 4.7 | 4.3 | 3.1 | 3.2 |
| 13 | CA-3[4] | 85 | MBS-1 | 15 | — | — | 6.0 | 3.7 | 3.5 | 3.2 |
| 14 | CA-3 | 72.5 | MBS-1 | 15 | diphenylmethane | 12.5 | 6.9 | 6.4 | 6.5 | 6.6 |
| 15 | CA-3 | 85 | MBS-1 ABS | 7.5 7.5 | — | — | 8.4 | 3.9 | 3.6 | 3.9 |
| 16 | CA-3 | 72.5 | MSB-1 ABS | 7.5 7.5 | diphenylmethane | 12.5 | 7.0 | 5.6 | 4.9 | 5.5 |
| 17 | CA-3 | 72.5 | MBS-1 ABS | 7.5 7.5 | 1,2-dichlorobenzene | 12.5 | 6.7 | 6.1 | 5.1 | 6.1 |

[1]ethyl cyanoacrylate, commercially available from Three Bond, Inc. of America
[2]ethyl cyanoacrylate containing 10 weight percent n-butyl cyanoacrylate, commercially available from Henkel Corp.
[3]methyl cyanoacrylate, commercially available from 3M.
[4]ethyl cyanoacrylate, commercially available from 3M.

Run nos. 2–4, 7–8, 11–12, 14, and 16–17 of this example illustrate the use of a variety of cyanoacrylate monomers in compositions of the invention, and the use of mixtures of tougheners therein.

EXAMPLE 8

Mixture Design

In a mixture design experiment, cyanoacrylate monomer ("CA-3" adhesive, modified by the addition of 0.1 weight percent tannic acid as adhesion promoter), treated toughener ("Blendex BTA-III F" terpolymer, treated according to the procedure described in Example 1) and sustainer (diphenylmethane) were combined in varying amounts and used to prepare T-peel bond specimens using the method and substrate of Example 4. The bonds were aged for 16 hours at room temperature and for two hours at 93° C., then cooled to room temperature prior to measurement of initial bond strength. Similar specimens, heat-aged for an additional seven or 14 days at 71° C., were similarly tested. Set out below in Table X are the run number, amount of each ingredient, T-peel strength, and failure mode for each run. Each measurement is an average of three bonds.

TABLE X

| Run no. | Cyanoacrylate monomer, wt. % | Toughener, wt. % | Sustainer, wt. % | T-Peel strength, kg/cm width (failure mode) Initial | Aged 7 days, 71° C. | Aged 14 days, 71° C. |
|---|---|---|---|---|---|---|
| 1 | 86 | 7 | 7 | 6.8 (SP) | 7.1 (ZS) | 5.7 (ZS) |
| 2 | 73 | 7 | 20 | 5.0 (SP) | 5.2 (SP) | 5.0 (SP) |
| 3 | 60 | 20 | 20 | 4.8 (SP) | 5.5 (SP) | 6.3 (SP) |
| 4 | 73 | 20 | 7 | 8.0 (SP) | 8.9 (ZS) | 9.3 (ZS) |
| 5 | 80 | 10 | 10 | 6.4 (SP) | 6.4 (SP) | 4.3 (ZS) |
| 6 | 73 | 10 | 17 | 5.0 (SP) | 5.0 (SP) | 3.9 (ZS) |
| 7 | 66 | 17 | 17 | 5.2 (SP) | 5.4 (SP) | 5.7 (SP) |
| 8 | 75 | 15 | 10 | 7.3 (SP) | 8.0 (SP) | 8.4 (SP) |
| 9 | 72 | 14 | 14 | 6.6 (SP) | 6.6 (SP) | 5.7 (SP) |
| 10 | 72 | 14 | 14 | 5.7 (SP) | 6.4 (SP) | 5.4 (SP) |

The mixture design experiment was repeated, with altered amounts of each component, and with measurements of bond strength on two thicknesses of C1018 CRS coupons (0.45 mm thick or 0.82 mm thick). Set out below in Table XI are the run number, amount of each ingredient, T-peel strengths, and failure mode for each run.

TABLE XI

| Run no. | Cyanoacrylate monomer, wt. % | Toughener, wt. % | Sustainer, wt. % | T-Peel strength, kg/cm width (failure mode) 0.45 mm thick C1018 CRS Initial | Aged 14 days, 71° C. | 0.82 mm thick C1018 CRS Initial | Aged 14 days, 71° C. |
|---|---|---|---|---|---|---|---|
| 1 | 75 | 25 | 0 | 0.9 (ZS) | 0.4 (Z) | 3.2 (ZS) | 1.8 (ZS) |
| 2 | 90 | 10 | 0 | 0.7 (ZS) | 0.4 (Z) | 1.3 (Z) | 1.3 (Z) |
| 3 | 80 | 10 | 10 | 5.2 (SP) | 6.3 (ZS) | 9.3 (SP) | 1.3 (Z) |
| 4 | 65 | 25 | 10 | 6.8 (SP) | 8.6 (SP) | 11.3 (SP) | 13.2 (SP) |
| 5 | 76 | 22 | 2 | 5.5 (ZS) | 1.8 (Z) | 10.2 (ZS) | 8.0 (ZS) |
| 6 | 83 | 17 | 0 | 1.4 (ZS) | 0.4 (Z) | 5.4 (ZS) | 2.1 (ZS) |
| 7 | 85 | 12 | 3 | 6.8 (SP) | 4.3 (ZS) | 8.0 (ZS) | 10.9 (SP) |
| 8 | 79 | 14 | 7 | 7.0 (SP) | 7.7 (SP) | 11.1 (SP) | 10.5 (SP) |
| 9 | 78 | 17 | 5 | 7.0 (SP) | 8.2 (ZS) | 10.4 (SP) | 11.8 (SP) |

TABLE XI-continued

| | Cyanoacrylate monomer, wt. % | Toughener, wt. % | Sustainer, wt. % | T-Peel strength, kg/cm width (failure mode) | | | |
|---|---|---|---|---|---|---|---|
| | | | | 0.45 mm thick C1018 CRS | | 0.82 mm thick C1018 CRS | |
| Run no. | | | | Initial | Aged 14 days, 71° C. | Initial | Aged 14 days, 71° C. |
| 10 | 73 | 23 | 4 | 7.5 (ZS) | 5.9 (ZS) | 11.3 (SP) | 14.1 (SP) |

These mixture designs illustrate the use of varying amounts of each ingredient in compositions of the invention, and are useful for selecting desired amounts of each ingredient.

EXAMPLE 9

Two-Part Adhesives

In a series of runs, several two-part adhesive formulations were prepared. The resulting compositions were mixed together in varying mixing ratios, shaken for 30 seconds, and applied to various substrates. T-peel samples were prepared and evaluated using the method of Example 1, but using only a single sample for each measurement. Overlap shear samples were prepared using 25.4 mm wide by 102 mm long by 0.82 mm thick C1018 CRS coupons, cleaned using the method of Example 1, with the ends of two coupons being mated to form a 12.7 mm long overlap bond with an approximate bond thickness of 0.003 to 0.025 mm. Three samples of each adhesive were tested for overlap shear strength using a Thwing-Albert tensile tester operated at a jaw separation rate of 2.54 mm per minute.

Set out below in Table XII are the amount of each component in part A or part B of each composition, the mixing ratio of part A to part B, and T-peel strength and overlap shear strength measurements for each run.

TABLE XII

| | Run No. | | | | | | |
|---|---|---|---|---|---|---|---|
| | 1 | 2[3] | 3 | 4 | 5 | 6 | 7 |
| Ingredients, Part A (wt %): | | | | | | | |
| "1741" cyanoacrylate | 73 | 73 | 73 | — | — | — | — |
| "CA-3" cyanoacrylate | — | — | — | 68 | — | — | — |
| "CA8-3A" cyanoacrylate | — | — | — | — | 68 | 68 | 73.9 |
| Treated MBS-1 | 20 | 20 | 20 | 17 | 20 | 20 | 15 |
| Diphenylmethane | 7 | 7 | 7 | 15 | — | — | — |
| 1,2-Dichlorobenzene | — | — | — | — | 12 | 12 | 11.1 |
| Tannic acid | — | — | 0.08 | — | — | — | — |
| Sulfur dioxide | 0.0075 | 0.0075 | 0.0075 | 0.0075 | 0.01 | 0.01 | 0.01 |
| Ingredients, Part B (wt %): | | | | | | | |
| Tetrabutylammonium tetrafluoroborate | 5.35 | 5.35 | 6.0 | 5.35 | — | — | — |
| Ethanol | 5.35 | 5.35 | 6.0 | 5.35 | — | — | — |
| Water | 5.35 | 5.35 | — | — | — | — | — |
| Tannic acid | 5.35 | 5.35 | — | 5.35 | — | — | — |
| MDI derivative[1] | — | — | — | — | 100 | 100 | — |
| Diethylene glycol diacetate[2] | 78.6 | 78.6 | 88 | 78.6 | — | — | — |
| n-butyl vinyl ether | — | — | — | — | — | — | 20 |
| Toluene | — | — | — | — | — | — | 80 |
| Mixing ratio, A/B (g/g) | 10/0.32 | 10/0.32 | 10/0.32 | 10/0.32 | 10/0.3 | 10/0.72 | 10/0.40 |
| T-Peel strength, kg/cm width (failure mode): | | | | | | | |
| 0.45 mm thick C1018 CRS | | | | | | | |
| Initial | 5.0 (SP) | 3.9 (SP) | — | 3.9 (SP) | 4.8 (SP) | 6.1 (SP) | 5.5 (SP) |
| Aged 2 hours, 93° C. + 7 days, 71° C. | 6.0 (SP) | 3.8 (SP) | — | 4.1 (SP) | 6.1 (SP) | 5.0 (SP) | 5.4 (SP) |
| Aged 2 hours, 93° C. + 14 days, 71° C. | 5.2 (SP) | 3.2 (SP) | — | 3.4 (SP) | 4.8 (ZS) | 4.6 (SP) | 4.8 (SP) |
| 0.82 mm thick C1018 CRS | | | | | | | |
| Initial | 6.2 (SP) | 4.1 (SP) | 6.4 (SP) | 3.8 (SP) | 8.4 (SP) | 6.1 (SP) | 5.2 (SP) |
| Aged 2 hours, 93° C. + 7 days, 71° C. | 6.2 (SP) | 3.9 (ZS) | 6.2 (SP) | 3.2 (SP) | 7.1 (ZS) | 4.8 (SP) | 5.9 (SP) |
| Aged 2 hours, 93° C. + 14 days, 71° C. | 6.8 (SP) | 2.2 (SP) | 4.6 (SP) | 3.4 (SP) | 10.7 (SP) | 2.9 (ZS) | 4.3 (SP) |
| Overlap shear strength, MPa | | | | | | | |
| Initial | 20.0 | 18.9 | — | 14.3 | 16.7 | 19.3 | 18.0 |
| Aged 7 days, 71° C., 100% R.H. | 10.5 | 9.5 | — | — | 13.4 | 11.5 | — |
| Aged 7 days, 93° C. | 15.5 | 12.9 | — | — | — | — | — |
| Aged 7 days, 121° C. | — | — | — | — | 5.9 | 7.6 | — |

[1]"Rubinate LF-179", 4,4'-diisocyanatodiphenylmethane reacted with about 10 weight percent of a short chain diol, commercially available from Rubicon Chemicals, Inc.
[2]"Cellusolve Acetate", commercially available from Union Carbide Corp.
[3]Run 2 has the same composition as Run 1, but was aged in its uncured form for 4 weeks at 49° C. prior to use.

The adhesive of Run 3 has a desirable balance of shelf stability and high peel strength. Part A of Run 3 is a good one-part adhesive for steel. The adhesive of Run 5 has a particularly desirable balance of high peel strength and retention of overlap shear strength after exposure of the cured bond to heat or heat and humidity.

The adhesive of Run 4 was used to prepared 180° peel strength test samples using a variety of adherends as test substrates. A 0.45 mm thick C1018 CRS coupon was bonded to 1.6 mm thick substrates of various metals. The CRS coupons and the metal substrates were cleaned using the method of Example 1 Bonds were aged 24 hours at room temperature prior to testing of initial bond strength, then aged a further two hours at 93° C. and seven or 14 days at 71° C. for tests of aged bond strength. To test bond strength, the CRS coupon was peeled away from the metal substrate at a 180° angle, using an "Instron" tensile tester model TM operated at a jaw separation rate of 50.8 cm/min.

Set out below in Table XIII are the substrate metal and 180° peel strength, measured initially and after aging for seven or 14 days at 71° C. All bonds failed via a smooth peel failure mode.

TABLE XIII

| Substrate | 180° Peel strength, kg/cm | | |
|---|---|---|---|
| | Initial | 2 hours, 93° C. + 7 days, 71° C. | 2 hours, 93° C. + 14 days, 71° C. |
| CRS | 5.9 | 6.4 | 5.2 |
| copper | 4.6 | 2.9 | 2.3 |
| brass | 5.0 | 4.1 | 3.4 |
| stainless steel | 5.2 | 5.0 | 5.2 |

Various modifications and alterations of this invention will be apparent to those skilled in the art without departing from the scope and spirit of this invention and the latter should not be restricted to that set forth herein for illustrative purposes.

What is claimed is:

1. A cyanoacrylate adhesive composition, comprising (a) cyanoacrylate monomer, (b) toughener comprising cyanoacrylate-compatible copolymer which comprises a thermoplastic polymer formed onto a rubbery polymer, wherein said toughener is treated to remove impurities which cause premature polymerization of cyanoacrylates and said toughener is selected from the group consisting of MBS, ABS or MABS copolymers, and (c) cyanoacrylate-compatible, toughener-compatible sustainer which provides improved retention of peel strength after heat aging of a cured bond of said adhesive composition, wherein said sustainer is selected from the group consisting of biphenyl, diphenylmethane, 4-bromochlorobenzene, 1,2-dichlorobenzene, 1,2,4-trichlorobenzene, 1,3-dimethoxybenzene, nitrobenzene, benzonitrile, and acetophenone.

2. A composition according to claim 1 containing about 60 to 80 percent by weight of said cyanoacrylate monomer, about 15 to 25 percent by weight of said toughener, and about 5 to 15 percent by weight of said sustainer, based on the total weight of said cyanoacrylate monomer, toughener, and sustainer.

3. A cyanoacrylate adhesive composition, comprising (a) ethyl or methyl cyanoacrylate monomer, (b) finely divided MBS terpolymer, said terpolymer containing less than about 10 ppm chloride ion and having a basicity of less than about $10^{-4}$ milliequivalents of KOH per gram, (c) sustainer selected from the group consisting of diphenylmethane and 1,2-dichlorobenzene, and (d) anionic polymerization inhibitor, said composition containing about 50 to 91 percent by weight of said cyanoacrylate monomer, about 7 to 25 percent by weight of said MBS terpolymer, and about 2 to 25 percent by weight of said sustainer based on the total weight of said cyanoacrylate monomer, toughener and sustainer, and said composition further containing about 25 to 100 ppm of said inhibitor based on the weight of said cyanoacrylate monomer.

4. A composition according to claim 3, in the form of two parts which are mixed together prior to use, the first of said two parts comprising said cyanoacrylate monomer, said MBS terpolymer, said sustainer, and said inhibitor, and the second of said two parts comprising a cyanoacrylate polymerization catalyst.

5. A cyanoacrylate adhesive composition, comprising (a) cyanoacrylate monomer, (b) toughener comprising a cyanoacrylate-compatible copolymer which comprises a thermoplastic polymer formed onto a rubbery polymer, and (c) cyanoacrylate-compatible, toughener-compatible sustainer which provides improved retention of peel strength after heat aging of a cured bond of said adhesives composition, wherein said sustainer comprises diphenylmethane.

* * * * *

UNITED STATES PATENT AND TRADEMARK OFFICE
CERTIFICATE OF CORRECTION

PATENT NO. : 4,560,723

DATED : December 24, 1985

INVENTOR(S) : George H. Millet, Edward R. Harrell and Charles D. Wright

It is certified that error appears in the above-identified patent and that said Letters Patent is hereby corrected as shown below:

Col. 4, line 53                          "level" should read -- levels --,

Col. 8, line 29                          "0.5" should read -- 0.5 g --.

Col. 9, line 24                          "in" should read -- is --.

Cols. 17 and 18, Table VIII          Run No. 12 "$\underline{t}$-butylphenyl" should read -- 4-$\underline{t}$-butylphenyl --.

Col. 22, line 54                        "prepared" should read -- prepare --.

Col. 22, line 59                        "Example 1 Bonds" should read -- Example 1. Bonds --.

UNITED STATES PATENT AND TRADEMARK OFFICE
CERTIFICATE OF CORRECTION

PATENT NO. : 4,560,723

DATED : December 24, 1985

INVENTOR(S) : George H. Millet, Edward R. Harrell and Charles D. Wright

It is certified that error appears in the above-identified patent and that said Letters Patent is hereby corrected as shown below:

Col. 24, line 34
   "adhesives" should read -- adhesive --.

Signed and Sealed this

Seventeenth Day of June 1986

[SEAL]

Attest:

DONALD J. QUIGG

Attesting Officer

Commissioner of Patents and Trademarks